Dec. 10, 1963 A. W. H. HIRSCH 3,113,482
DECORATIVE TWIRLING BATON SHAFT
Filed Nov. 9, 1960
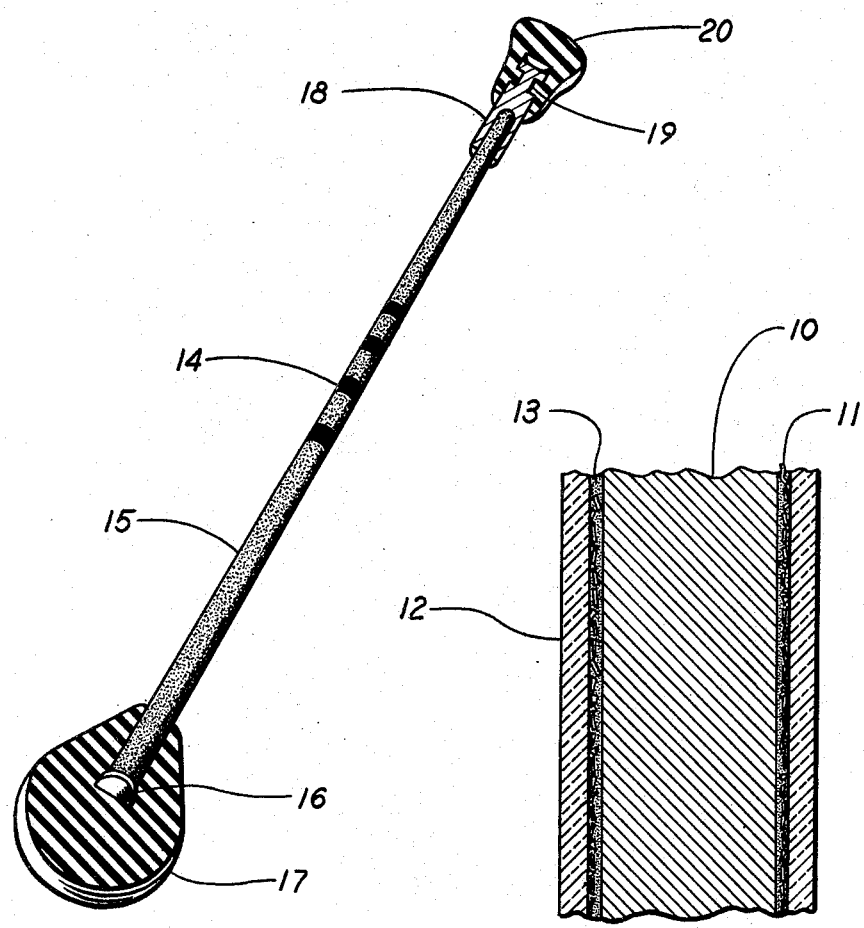
FIG. 1.
FIG. 2.
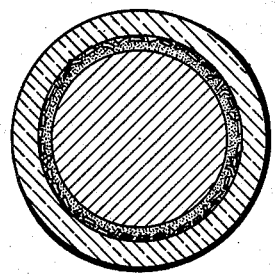
FIG. 3.
ALBERT W. H. HIRSCH
INVENTOR:
BY: *[signature]*
ATTORNEY

United States Patent Office 3,113,482
Patented Dec. 10, 1963

3,113,482
DECORATIVE TWIRLING BATON SHAFT
Albert W. H. Hirsch, Tampa, Fla.
Filed Nov. 9, 1960, Ser. No. 68,291
7 Claims. (Cl. 84—477)

This invention relates to batons and is particularly concerned with the twirling batons of the type characteristically used by drum majors, band leaders, and parade majorettes.

It is among the objects of the present invention to provide a baton shaft of vastly improved luster, brilliance and glitter, as compared to present day baton shafts of polished chrome or nickel-plated shafts. Not only does the practice of the present invention enhance the reflective qualities of the surface of the shaft, but lends itself to a wide variety of solid or variegated colors and color designs. In addition, by the use of flaked pigmentation, a dispersed or mottled appearance may be achieved, far more attractive and captivating than the use of solid colors or the plain polished metal heretofore universally utilized.

However, the object of the invention is not limited solely to the appearance of the shaft. Rigid metal tubing, common in present day baton shafts, are subject to fracture, bending and twisting, as the result of strain or impact. The shaft of the present invention, including a central core, preferably of solid tough plastic material, such as polyester fiber glass or the like, has high flexural and impact strength resisting a permanent set resulting from hurling or twisting strains, as well as inhibiting the possibility of fracture.

It is also among the objects of the invention to provide a baton shaft surface which is scratch and abrasive resistant. By the use of a tough, non-rigid, plastic exterior, mishaps which would mar and disfigure a metal surface will not so mutilate the present shaft. Further, the present surface resists perspiration attack and provides an improved friction, facilitating twirling and catching. Since the external surface and the core are both tough and non-rigid, cracks and fractures do not occur despite rough treatment or weather exposure.

Broadly speaking that form of the invention here shown by way of example may be defined as including a non-metallic core such as a solid rod of polyester fiber glass. Unified with the surface of the rod as by a cured transparent resin binder there is provided such pigmentation as desired. In one preferred form of the invention such pigmentation may be in the form of flat flakes of metallic glitter, tinsel, sparkles, pearl flakes and the like. With such flake materials disposed in parallel conformity with the curvature of the round core a crinkled highly reflective effect may be achieved and a minimum expense is encountered with respect to such pigmentation. It will be understood, however, that the practice of the invention is not limited nor confined to such flaked pigments, dry pigments may be employed including phosphorescent and fluorescent powders or granules and metallic powders. Enclosing the core and pigments as a fused lamination therewith is an extension sheath of tough transparent non-rigid plastic material.

From a consideration of the following specification taken in conjunction with the accompanying drawings, numerous other objects, features and advantages will become apparent.

In the drawings,

FIG. 1 is a perspective view of a complete baton utilizing the shaft of the present invention, with the terminal balls shown in section, FIG. 2 is a fragmentary longitudinal section through the shaft of the baton shown in FIGURE 1, and FIG. 3 is a cross section of the shaft of the present invention.

In order to avoid the complete rigidity of the hollow metallic baton shafts heretofore used in twirling batons, the shaft here shown is formed of a solid core of a plastic composition, preferably polyester fiber glass. The elongate round solid rod of uniform diameter throughout its length is indicated in FIGURES 2 and 3 of the drawings by the numeral 10. Such rods are not only tough and relatively unbreakable, but while relatively rigid they are amenable to slight flexure without distortion or permanent set. Such flexure materially adds to the facility of twirling and reduces the sharp hand impact when the baton is caught after having been thrown in the air. Further, such material will not become permanently distorted from application of torque. Should axial twisting or bending temporarily strain the core from its normal formation, the flexibility of the material will immediately return the core to its original form after such pressures are relieved. While the weight of conventional polyester fiber glass rod of appropriate diameter and length is appropriate for twirling batons, it will be understood that the weight may be varied by the inclusion in the core material of weighting substances. Since the core is invisible in the finished shaft its color or surface appearance is immaterial. While polyester fiber glass has been found eminently satisfactory for the shaft core, the invention is not so limited. Numerous other materials either metallic or non-metallic may be employed, such as solid or hollow metal or composition rods, wood or other material, but preferably of a non-rigid character.

The plastic composition core 10 of the baton is surrounded by pigmentation which may be of a wide variety of varied types and flaked or solid colors, including phosphorescent or fluorescent materials. In the present form of the invention reflective flaked material 11 is illustrated, with the flakes arranged in parallel relation to the surface of the core. Such flakes may be of metallic glitter, pearl flakes, tinsel, sparkles or other attention commanding materials. Since the flakes are disposed in parallelism with the surface of the core, it will be seen that a minimum quantity of such usually expensive material is required to fully cover the core, and to present a dazzling appearance.

The flake material 11 or such other decorative or pigmentation material is bound to the surface of the rod 10 and to the external transparent plastic casing 12 in the manner hereinafter set forth, by an intermediate binding material of cured transparent resin 13 to form an integral fused unit.

Surrounding and encasing the pigmentation glitter, fluorescent or phosphorescent material and the rod 10 there is provided the transparent tough plastic coating or casing 12, which retains and seals the pigmentation, permanently locking the flake material in parallel disposition with the respect to the core, whereby displacement thereof is impossible. Since the transparent plastic casing may be highly polished, a brilliant and highly lustrous wand is achieved. Further, since a non-rigid, scratch, crack and chip resistant plastic is selected, danger of marring the surface by abrasion is substantially eliminated as is surface fracture. Also since such plastic materials are inert there is no liability of injury to the user by active chemicals of the pigmentation and perspiration stain or tarnish will not take place. Despite high polish plastic materials provide substantially greater friction, as compared with the highly polished metal wands heretofore used, thus materially facilitating the twirling and maneuvering of such devices.

In the manufacture of a baton shaft of the character herein set forth, the core 10 such as of polyester fiber glass of a desired and preferably uniform circular cross section, is cut to the desired length. Similarly a length of round hollow non-rigid clear plastic casing tube 12 of conforming length is cut. The normal internal diameter of the plastic tube is of litle, if any, greater diameter than the external diameter of the core. The decorative material 11 is then cemented to the inner face of the casing by the use of a transparent resin binder, and the rod 10 is heavily coated with the same type of resin. The tube is then expanded by heat, increasing its internal diameter to permit insertion of the core rod. The heat of the casing cures the transparent resin and as the casing cools it shrinks to encase the rod to form a fused integral unit. As noted at 14 in FIGURE 1 the entire inner surface of the casing need not be coated with any single pigmentation combination. Decorative materials of varying types and colors may be employed to achieve innumerable design effects.

The completed baton illustrated in perspective in FIGURE 1, includes the shaft 15 formed in accordance with the present invention. A metallic cap 16 encloses one end of the shaft over which the usual rubber ball 17 is mounted. At the opposite end of the shaft a metal ferrule 18 is provided, the outer end of which is recessed as at 19 to secure the conventional rubber tip 20 and to provide the required counterbalance.

In the consideration of the foregoing, it will be understood that while specific materials are referred to equivalent materials are contemplated and in the practice of the invention changes and modifications may be resorted to without departure from the spirit or scope of the invention as outlined in the appended claims.

What I claim is:
1. The method of making a device of the character set forth, including the steps of coating a fiber glass rod with transparent resin, depositing an internal coating of decorative material on the inside of a transparent plastic tube of an internal diameter commensurate with the external diameter of said rod, heating said tube to expand its internal diameter beyond the external diameter of said rod and transparent resin, inserting said rod and resin in said expanded tube and cooling said tube to shrink the tube about said rod, whereby the heat of said tube before cooling assists the curing of the resin to form an integral fused union of rod, resin, decorative material and tube.

2. A decorative twirling baton shaft, including an elongate solid cylindrical semi-rigid core and elongated preformed hollow cylindrical transparent semi-rigid plastic outer casing bonded to the core throughout its entire length, said casing conforming in length and internal diameter with the length and external diameter of said core, and decorative material bonded between said core and casing.

3. A decorative twirling baton shaft, including an elongate cylindrical semi-rigid core of solid polyester fiber glass, an elongate hollow preformed cylindrical transparent semi-rigid plastic outer casing bonded to the core throughout its entire length, said casing conforming in length and internal diameter with the length and external diameter of said core, and decorative material between said core and casing.

4. A decorative twirling baton shaft, including an elongate preformed cylindrical semi-rigid core of solid polyester fiber glass, an elongate hollow preformed cylindrical transparent semi-rigid plastic outer casing, conforming in length and internal diameter with the length and external diameter of said core, decorative material between said core and casing, said core, decorative material and casing being integrally bonded together by a cured transparent resin.

5. The baton shaft as set forth in claim 4 in which the decorative material is in the form of reflective flakes.

6. The baton shaft as set forth in claim 4, in which the decorative material is fluorescent.

7. The baton shaft as set forth in claim 4, in which the decorative material is phosphorescent.

References Cited in the file of this patent
UNITED STATES PATENTS

| | | |
|---|---|---|
| 1,422,841 | Dey | July 18, 1922 |
| 2,561,228 | Richey | July 17, 1951 |
| 2,605,514 | Eshenaur et al. | Aug. 5, 1952 |
| 2,714,559 | Sheffield et al. | Aug. 2, 1955 |
| 2,931,739 | Marzocchi et al. | Apr. 5, 1960 |

OTHER REFERENCES

"Iridescence Built into Plastic," Modern Plastics, January 1951.